US 7,699,081 B2

(12) United States Patent
Mauchlen

(10) Patent No.: US 7,699,081 B2
(45) Date of Patent: Apr. 20, 2010

(54) FELLING HEAD ACCUMULATOR ARM

(75) Inventor: Leslie Mauchlen, Cambridge (CA)

(73) Assignee: Timberjack, Inc., Woodstock (CA)

( * ) Notice: Subject to any disclaimer, the term of this patent is extended or adjusted under 35 U.S.C. 154(b) by 56 days.

(21) Appl. No.: 11/615,540

(22) Filed: Dec. 22, 2006

(65) Prior Publication Data
US 2007/0107803 A1 May 17, 2007

Related U.S. Application Data

(63) Continuation of application No. 10/839,528, filed on May 5, 2004, now Pat. No. 7,174,932.

(60) Provisional application No. 60/467,982, filed on May 5, 2003.

(51) Int. Cl.
A01G 23/081 (2006.01)
(52) U.S. Cl. .................................. 144/4.1; 144/34.1
(58) Field of Classification Search ................. 144/4.1, 144/34.1, 34.5, 335, 336
See application file for complete search history.

(56) References Cited

U.S. PATENT DOCUMENTS

| 3,910,326 | A | 10/1975 | Tucek |
| 3,911,981 | A * | 10/1975 | Tucek ..................... 144/34.5 |
| RE29,235 | E | 5/1977 | Kurelek |
| 4,909,291 | A | 3/1990 | Tremblay |
| 5,004,026 | A * | 4/1991 | MacLennan et al. ......... 144/4.1 |
| 5,697,412 | A | 12/1997 | Kurelek |
| 5,813,308 | A | 9/1998 | Wildey et al. |
| 5,816,299 | A | 10/1998 | Mathews et al. |
| 6,068,035 | A | 5/2000 | DiSabatino et al. |
| 6,152,201 | A | 11/2000 | Kurelek |
| 6,173,973 | B1 | 1/2001 | Robinson |
| 6,374,877 | B1 | 4/2002 | Wildey |
| 6,640,850 | B1 | 11/2003 | Hicks |
| 6,779,570 | B2 | 8/2004 | Tardif |
| 7,174,932 | B2 | 2/2007 | Mauchlen |
| 7,306,018 | B2 * | 12/2007 | Hicks et al. ................. 144/336 |
| 2004/0221921 | A1 | 11/2004 | DiSabatino |

* cited by examiner

Primary Examiner—Shelley Self
(74) Attorney, Agent, or Firm—Quarles & Brady LLP

(57) ABSTRACT

An accumulator arm for a felling head has inner and outer arms which are hydraulically driven open and closed. The inner and outer sides of the outer arm are curved away from an accumulation pocket and toward a harvesting arm, wherein the accumulator arm can be pulled around a newly cut tree to add the tree to the accumulation pocket with a lesser amount of hydraulic force and with lesser damage to the trees.

8 Claims, 2 Drawing Sheets

FELLING HEAD ACCUMULATOR ARM

CROSS-REFERENCE TO RELATED APPLICATION

This application is a continuation of allowed U.S. patent application Ser. No. 10/839,528 filed May 5, 2004, now U.S. Pat. No. 7,174,932, which claims the benefit of U.S. Provisional Application No. 60/467,982 filed May 5, 2003, hereby incorporated by reference.

BACKGROUND OF THE INVENTION

1. Field of the Invention

This invention relates to forestry equipment, and in particular to a feller buncher for felling and accumulating trees.

2. Discussion of the Prior Art

Felling heads are widely used in the logging industry for accumulating in a vertical position several freshly cut trees prior to laying down the bundle at once, to be transported to roadside by a skidder or forwarder. The felling head is mounted to a heavy duty vehicle, such as a drive to tree or swing to tree wheeled or tracked vehicle, for high efficiency logging. Examples of feller buncher and associated felling heads are shown, for example, in U.S. Pat. Nos. 5,813,308; 5,816,299; 6,068,035; 6,173,973; and 6,374,877 which are incorporated by reference for their description of the construction and operation of such devices.

One type of felling head uses a large saw blade disc having peripheral cutting teeth. The disc is rotated in a horizontal plane below a butt plate, with the teeth exposed at the front of the butt plate. As successive trees are cut, harvesting arms are actuated to pull the tree into an accumulation pocket while at the same time an accumulator arm is withdrawn from the accumulation pocket and then moved behind or brought around the bundle of accumulated trees to add the newly cut tree to the bundle. See, for example, the prior art felling head 10 which is illustrated in FIGS. 1-4. Here, an accumulator arm 16, comprising an inner arm 26 pivotally coupled to a frame of the feller 20 at axis 23 and an outer arm 30 pivotally coupled to a distal end of the inner arm 26 at an axis 38, holds cut trees T2-T4 in an accumulation pocket 17. The outer arm 30 is typical of prior art accumulator arms, and has a relatively straight arm configuration for retaining the trees T2-T4 in the pocket 17. Although a straight arm configuration is shown, it is also known in the prior art to provide accumulator arms which curve toward the accumulation pocket 17, so as to interface with the accumulated stems with a concave surface, and present a convex surface to newly cut trees which are being moved into the accumulation pocket.

Referring still to FIGS. 1-4, a cut tree T1, cut by blade 12, is supported on the butt plate 14 and held in place by one or more pivotable harvesting arms 18, which retains the tree T1 against the accumulator arm 16. To add the tree T1 to the existing bundle of trees T2-T4, the hydraulic cylinder 22 is initially activated to enclose the tree T1 between the accumulator arm 16 and the harvesting arm 18 as shown in FIG. 1. To move the tree T1 to the accumulation pocket 17, the hydraulic cylinder 22 is activated to rotate the inner arm 26 outward, as shown in progression in FIGS. 2-4, causing the spring loaded or hydraulically biased outer arm 30 to pivot about the axis 38 (against the bias of the spring or hydraulic cylinder) and to be retracted from the accumulation pocket 17, as seen in FIG. 4. The accumulator arm 16 can then be driven in the opposing direction by the hydraulic cylinder 22 to position the accumulator arm 16 behind the tree T1 to form a bundle of trees T1-T4 in the accumulation pocket 17.

As the arm 16 is driven around the tree T1, the straight arm contacts the tree T1 at a contact point which is offset from a line drawn through the center of the tree, and specifically offset in the direction of the pivot point of the arm. The force applied to the tree by the arm, therefore, has a significant component that tends to drive the tree toward the axis of rotation of the arm, opposite the desired direction that would facilitate withdrawal of the arm part of the tree. Because of this force component, a significant amount of energy is wasted in withdrawing the arm around the tree.

While accumulator arms such as the one shown are generally successful in accumulating trees in an accumulation pocket, as can be seen in FIGS. 1-4, when a new tree is cut and held against the accumulator arm 16, it is difficult for the arm to pull out behind the newly clamped tree T1. Referring particularly to FIGS. 2 and 3, as the outer arm 30 is withdrawn behind the tree, the distance between the edge of outer arm 30 adjacent the tree T1 and the edge of the harvesting arm 18 adjacent T1 decreases as the arm 16 is withdrawn, such that the outer side of the accumulator arm is forced against the cut tree T1 and harvesting arm 18. The arm 16 therefore is pushed against the newly cut tree against the resistive force of the harvesting arm 18, and a significant force and a corresponding expenditure of energy is required to push the harvesting arm 18 over the spring force or hydraulic relief pressure biasing it as the accumulator arm 16 is forced out. This procedure is not only energy intensive, but can also result in damage to the cut tree. Furthermore, when the accumulator arm 16 is configured as shown or with an outer arm curved toward the pocket 17, the outer arm 30 can also become trapped or jammed by a newly cut tree. In this situation, although the inner arm 26 is fully open, the outer arm 30 is unable to withdraw from the bundle. When this occurs, the operator must either try to rearrange the load by jerking the head, or drop the load, both of which are time consuming and hard on the equipment.

SUMMARY OF THE INVENTION

The present invention provides a felling head having at least one accumulator arm for holding a bundle of two or more cut trees which overcomes the above problems. The accumulator arm has an inner arm pivotally connected at its near end to the felling head frame and an outer arm pivotally connected to the opposite, distal end of the inner arm. The inner and outer arms are driven to close around the bundle and retract from it, as in the prior art. An accumulator arm of the invention differs from the prior art in that the arm is convex toward the accumulating pocket. The curve of the arm allows it to rotate about a newly clamped tree without pushing significantly against the harvesting arm. Therefore, the amount of energy required to drive the accumulator arm is reduced. Damage caused to the tree trunks by the accumulator arm is also reduced and, furthermore, retraction of the arm is smoother, thereby keeping the trees in the accumulation pocket straight.

In one aspect of the invention, a felling head having at least one accumulator arm for holding a bundle of two or more cut trees in an accumulation pocket is provided. The accumulator arm includes an inner arm pivotally connected to a frame of the felling head, and an outer arm pivotally connected to a distal end of the inner arm. The inner and outer arms are driven to close around the bundle and to retract from the bundle, and the outer arm has an inner side facing the accumulation pocket and an outer side facing away from the accumulation pocket. The outer side of the outer arm is concave in the direction away from the accumulation pocket (convex in the direction toward the accumulation pocket).

In another aspect of the invention, a tree felling and accumulating head is provided. The felling and accumulating head includes a saw housing securable to a feller buncher vehicle, a circular saw rotatably mounted to said saw housing and in a saw housing having an exposed front portion, and a butt plate overlying said saw adjacent said exposed front portion. The butt plate includes an accumulation pocket provided at a corner of the butt plate adjacent the saw housing for accumulating a bundle of trees severed by the circular saw. A harvesting arm is rotatably mounted above the butt plate for moving a severed tree onto the butt plate, and an accumulator arm is pivotally mounted on said support frame, and is moveable from a first position in which the accumulator arm retains the trees in the accumulation pocket and a second position in which the accumulator arm is retracted from the accumulation pocket to allow the harvesting arm to push a severed tree toward the bundle in the accumulation pocket. The accumulator arm includes an edge in a pocket of the accumulation pocket and a side opposite the accumulation pocket. At least a portion of the surface opposite the accumulation pocket is concave away from the accumulation pocket, while at least a portion of the surface facing the accumulation pocket is convex toward the accumulation pocket.

These and other objects and advantages of the invention will be apparent from the drawings and detailed description.

BRIEF DESCRIPTION OF THE DRAWINGS

FIG. 6 is a top plan view of the felling head of the present invention in a position analogous to that shown in FIG. 2;

DETAILED DESCRIPTION OF THE PREFERRED EMBODIMENT

Figure 1:
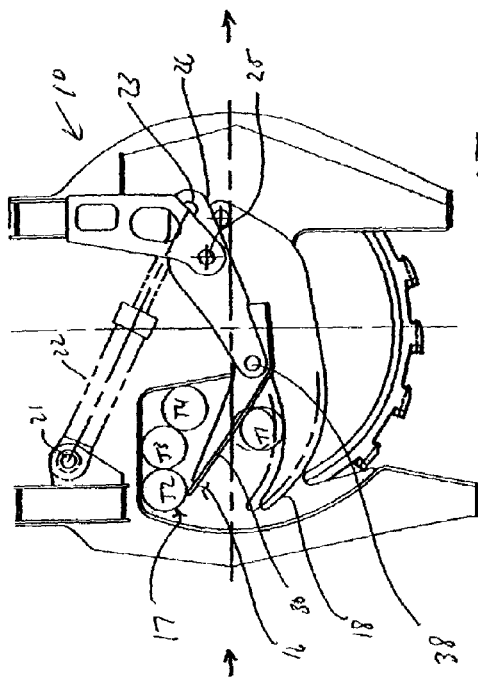
FIG. 1 is a top plan view of a prior art felling head in a closed position wherein the accumulator arm and harvest arm are holding a newly cut tree.

Referring again to the figures, and more particularly to FIGS. 5-8, the felling head 50 of the present invention is shown. Here, parts of the felling head 50 which are the same as parts of the prior art felling head 10 described above have been labeled with the same reference numbers. Generally, the felling head 50 of the present invention includes similar parts to those of the prior art felling head 10. Here, however, the accumulator arm 40 includes an outer arm portion 45 which is concave on both the inner side and the outer side in the direction away from the accumulation pocket 17.

Referring still to FIGS. 5-8, the felling head 50 of the present invention comprises a disc saw blade 12 mounted in a saw blade housing 24 having an exposed front end 26 from which the blade 12 extends to sever trees. The saw blade housing 24 is mounted to a frame 20, which is secured to a feller buncher vehicle (not shown). A butt plate 14 is mounted in the exposed front end area 27 of the saw housing 24 and above the saw blade 12. A harvesting arm 18 is rotatably mounted above the butt plate 14 and is rotatable to move severed trees onto the butt plate. An accumulation pocket 17 is formed in a corner of the butt plate 14 adjacent the saw blade housing 24, and an outer arm 45 of an accumulation arm 40 retains a bunch of felled trees T1, T2, and T4 in the accumulation pocket 17. The outer arm 45 includes a first side 46 facing toward the accumulation pocket 17 and a second side 47 on the opposing side of the arm 45, facing away from the accumulation pocket 17. The side 46 is convex toward the accumulation pocket while the side 47 is concave away from the accumulation pocket 17. The harvesting arm 18, on the other hand, includes a first side 48 adjacent the accumulator outer arm 45 and a second side 49 on the opposing side of the arm 18, and each of these sides are curved toward, or concave in the direction of, the accumulation pocket 17. The radius of curvature of each of the harvesting arm 18 and the outer arm 45 is preferably selected to allow an average sized tree to be held between the harvesting arm 18 and the outer arm 45 with a minimal amount of force on the tree as described below.

Figure 5:
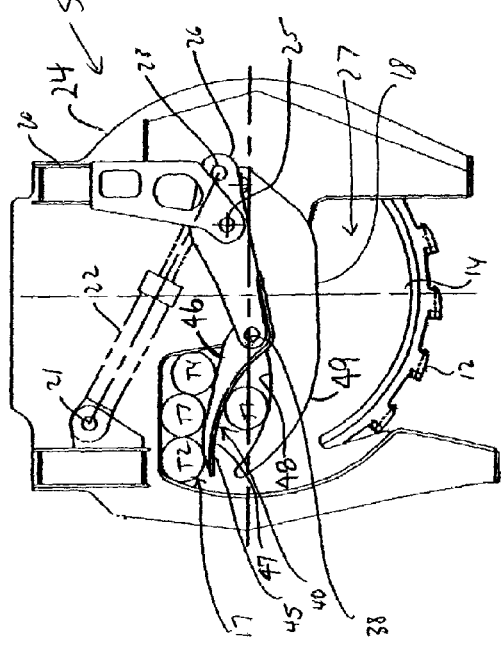
FIG. 5 is a top plan view of the felling head of the present invention in a position analogous to that shown in FIG. 1.

Referring now specifically to FIG. 5, the newly cut tree T1 is shown in an analogous position to that shown and described above with reference to FIG. 1, held between the harvesting arm 18 and accumulator arm 40. As described above, the outer arm 45 has an outer side 47 that is concave away from the accumulation pocket 17 and is therefore curved around the newly cut tree T1. The inner side 46 facing toward the accumulation pocket 17 is convex toward the accumulated trees T2-T4 held in the accumulation pocket 17. In this first position, the accumulator arm 40 is maintained across an opening to the accumulation pocket 17 and maintains the trees T2-T4 in the pocket 17.

Figure 4:
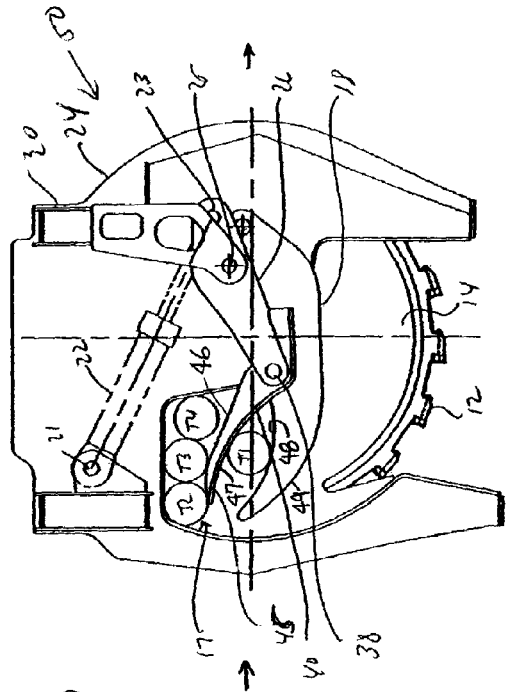
FIG. 4 is a top plan view of the felling head of FIG. 3 as the accumulator arm opens to move the tree into the accumulator.
Figure 2:
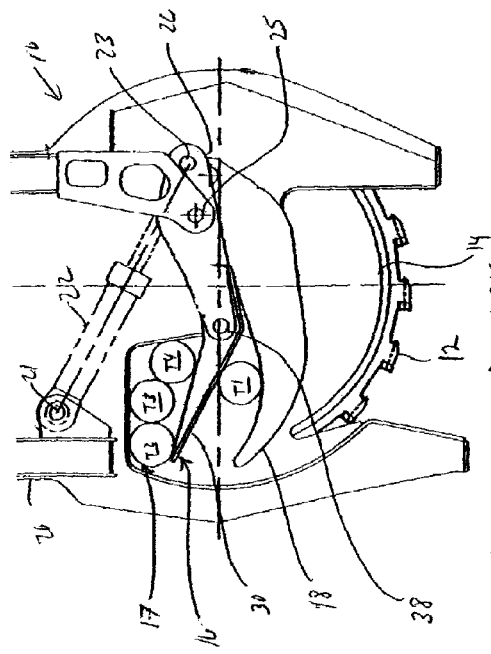
FIG. 2 is a top plan view of the felling head of FIG. 1 as the accumulator arm begins to open.
Figure 3:
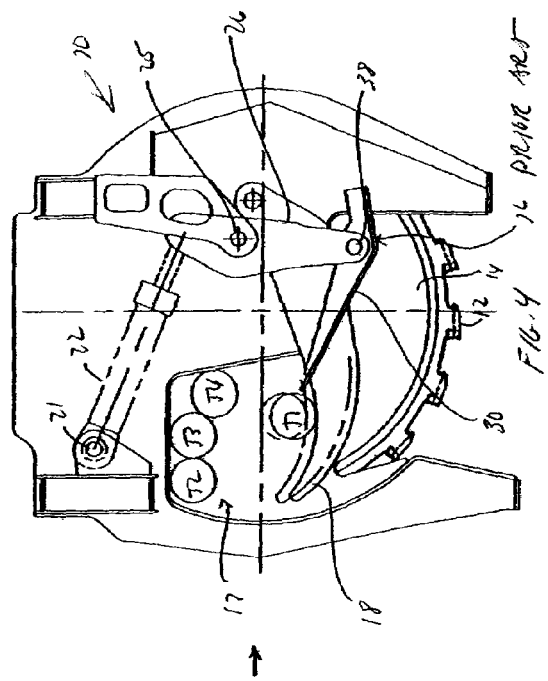
FIG. 3 is a top plan view of the felling head of FIG. 2 as the accumulator arm continues to open.
Figure 7:
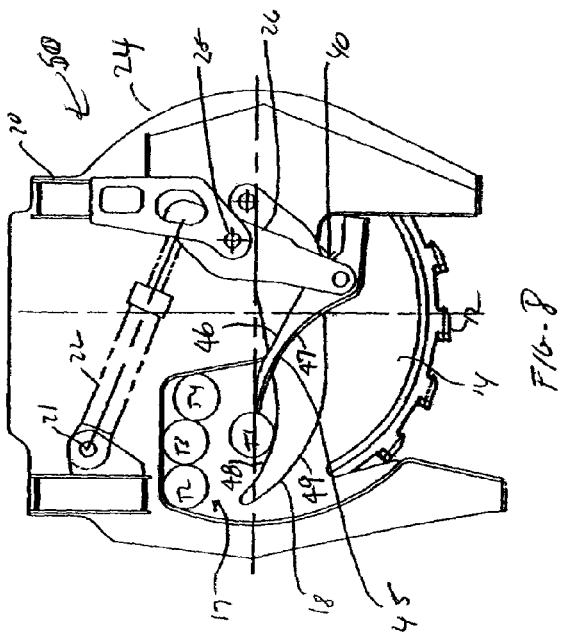
FIG. 7 is a top plan view of the felling head of the present invention in a position analogous to FIG. 3.
Figure 4:
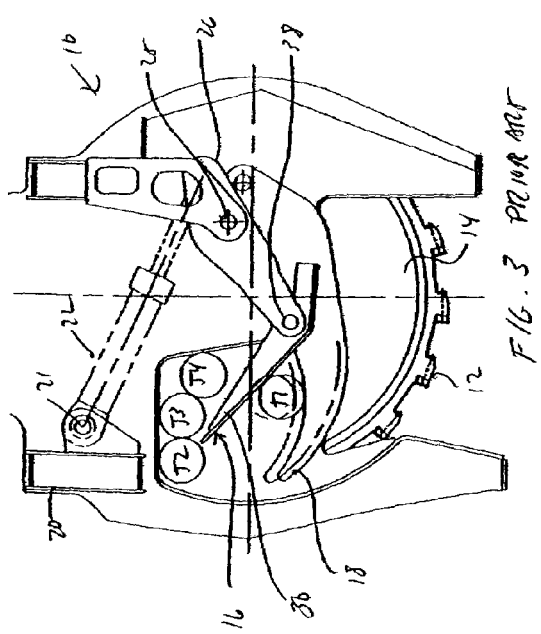
Figure 8:
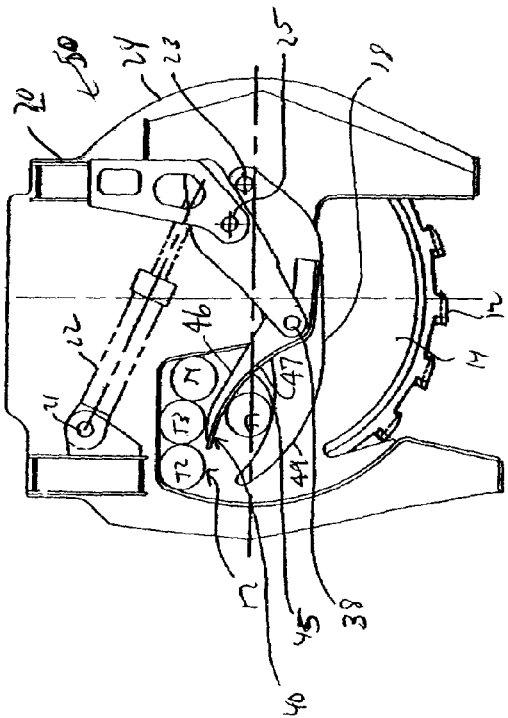
FIG. 8 is a top plan view of the felling head of the present invention in a position analogous to FIG. 4.

Referring now to FIGS. 6-8, the accumulator arm 40 is shown in various stages of withdrawal, analogous to those described with reference to FIGS. 2-4 above, as outer arm 45 of the accumulator arm 40 is moved from the first position described above, to a second position in which the accumulation pocket 17 is open to receive a new severed tree (FIG. 8). Referring still to FIGS. 6-8, the hydraulic cylinder 22 is activated to rotate the inner arm 26 of the accumulation arm 40 and to pivot the outer arm 45 from the first position (FIG. 5) to the second position (FIG. 8), the curvature of the outer arm 45 limits the force applied between the accumulator arm 45 and the harvesting arm 18, and allows the tree T1 to be added to the accumulation pocket 17 with a significantly reduced amount of hydraulic or spring force as compared to the prior art device shown in FIGS. 1-4. Furthermore, because of the curvature of the outer arm 45 of the accumulator arm 40, damage to the tree T1 is significantly reduced as compared to the prior art felling head 10.

Referring still to FIGS. 6-8, specifically, as the outer arm 45 is pivoted away from the accumulation pocket 17 and around the tree T1, the distance between the side of the harvesting arm 18 adjacent the tree T1 and the side of the outer arm 45 adjacent tree T1 does not contract as in the prior art, but remains substantially the same or expands, allowing the arm 45 to be rotated around the tree T1 with little or no contact required between the tree T1 and the outer arm 45, and with little or no force applied against the harvesting arm 18. Therefore, the required force to move the outer arm 45 around the tree T1 is reduced, the amount of energy required is reduced, and the tree T1 is less likely to be damaged than in the system shown with reference to FIGS. 1-4. Furthermore, because retraction of the accumulator arm 16 is comparatively smooth, there is less disruption to the accumulated bunch of trees in the accumulation pocket 17, and the accumulated trees T2-T4 are therefore more likely to remain straight in the accumulation pocket 17. Additionally, as the outer arm 45 can be more easily moved around the tree T1, jamming problems caused, for example, by the accumulator arm 40 becoming engaged in a tree are significantly reduced as compared to the prior art.

Put another way, because the side 47 of the outer arm 45 is concave away from the accumulation pocket 17, a line drawn from the point of contact of the arm 45 on the tree T1 through the tree center is substantially normal to a line drawn from the contact point to the pivot axis of the arm 45. The force provided on the tree T1 by the outer arm 45 is therefore substantially normal, and significantly more normal than in the prior art. Furthermore, as the side 46 of the outer arm 45 is convex toward the accumulation pocket 17, the force applied by the arm 45 on the trees T2, T3, and T4 is also substantially more normal to a line drawn through the pivot axis of the arm 45. As the arm is withdrawn, therefore, the force applied both to the trees T2, T3, and T4 in the accumulation pocket 17 and to the tree T1 to be moved into the accumulation pocket 17 have less of a tendency to move the trees back toward the pivot axis of the arm 45. Therefore, energy is not wasted in exerting forces which drive the trees back and forth within the accumulation pocket 17, and therefore the amount of energy expended is reduced as compared to the prior art. Furthermore, the arm 45 can be withdrawn from the accumulation pocket 17 with a decreased amount of force and, hence, decreased energy requirements, so that more trees can be accumulated.

A preferred embodiment of the invention has been shown and described in detail. Many modifications and variations of the embodiment described will be apparent to those skilled in the art. For example, various mechanisms may be used to power the inner and outer arms opened and closed. Furthermore, although the accumulator arm and outer arm are shown pivoted on the same side of the saw motor axis, the accumulator arm could also be structured with one arm pivoted on one side, and the other arm pivoted on the other side. The present invention can also be applied to other arm configurations known to those of skill in the art. Furthermore, although both sides of the outer arm 45 of the accumulator arm 40 and of the harvesting arm 18 have been described as curved, it will be apparent that the advantages of the present invention can also be achieved with a facing portion of each of each of the harvesting arm and accumulating arm being curved. Additionally, although the non-facing sides of the harvesting and accumulator arms have been described above as curved, these sides could also be straight, or shaped in various other ways. Therefore, the invention is not limited to the embodiment described.

I claim:

1. In a felling head having at least one accumulator arm for holding a bundle of two or more cut trees in an accumulation pocket located on a butt plate for receiving cut trees, said accumulator arm including an inner arm pivotally connected to a frame of said felling head and an outer arm pivotally connected to a distal end of the inner arm, said inner and outer arms being driven to close around the bundle and retract from the bundle, and the outer arm has an inner side facing the accumulation pocket and an outer side facing away from the accumulation pocket, the improvement wherein said outer side of said outer arm is concave in the direction away from the accumulation pocket.

2. The felling head as claimed in claim 1, wherein said concave outer side of said outer arm contacts a newly cut tree being moved into the accumulation pocket.

3. The felling head as claimed in claim 1, wherein said concave outer side curves toward a freshly cut tree that is in contact with said outer side.

4. The felling head as claimed in claim 1, wherein said inner side of said outer arm is convex toward the accumulation pocket.

5. The felling head as claimed in claim 3, wherein said convex inner side of said outer arm contacts a bundle of trees accumulated in said accumulation pocket.

6. In a felling head having at least one accumulator arm for holding a bundle of two or more cut trees in an accumulation pocket on a butt plate, said accumulator arm including an inner arm pivotally connected to a frame of said felling head and an outer arm pivotally connected to a distal end of the inner arm, said inner and outer arms being driven to close wound the bundle and refract from the bundle, and the outer arm has an inner side facing the accumulation pocket and an outer side facing away from the accumulation pocket, the improvement wherein said inner side of said outer arm is convex in the direction toward the accumulation pocket.

7. The felling head as claimed in claim 6, wherein said inner side of said outer arm is convex toward the accumulation pocket.

8. The felling head as claimed in claim 6, wherein said convex inner side of said outer arm curves away from a bundle of trees held in said accumulation pocket.

* * * * *

UNITED STATES PATENT AND TRADEMARK OFFICE
CERTIFICATE OF CORRECTION

PATENT NO. : 7,699,081 B2　　　　　　　　　　　　　　　　　　　　　　　　Page 1 of 1
APPLICATION NO. : 11/615540
DATED : April 20, 2010
INVENTOR(S) : Leslie Mauchlen It is certified that error appears in the above-identified patent and that said Letters Patent is hereby corrected as shown below:

Column 6, Claim 6, Line 35: "wound" should be --around--.

Column 6, Claim 6, Line 35: "refract" should be --retract--.

Signed and Sealed this

Fifteenth Day of June, 2010

David J. Kappos
*Director of the United States Patent and Trademark Office*